Sept. 15, 1931.  O. MESSTER  1,823,751
ROLL FILM CAMERA
Filed Nov. 13, 1929

O. Messter INVENTOR
By: Marks & Clerk ATT'YS.

Patented Sept. 15, 1931

1,823,751

UNITED STATES PATENT OFFICE

OSKAR MESSTER, OF DAHLEM, NEAR BERLIN, GERMANY

ROLL-FILM CAMERA

Application filed November 13, 1929, Serial No. 406,932, and in Germany December 10, 1926.

This invention relates to roll-film cameras of the type in which a strip of film is held flat, prior to and during each exposure, against a wall of the camera by compressed air.

The object of the invention is generally to improve the construction and operation of such cameras and, more particularly, to make them suitable for taking serial pictures, for example in landscape.

According to the invention the device supplying the compressed air to the camera is coupled to the shutter mechanism and to the means for feeding the film, the arrangement being such that the atmosphere in the camera is compressed during the exposure, but is relieved during the feeding of the film.

The drawings diagrammatically illustrate a typical embodiment of the invention.

Figure 1:
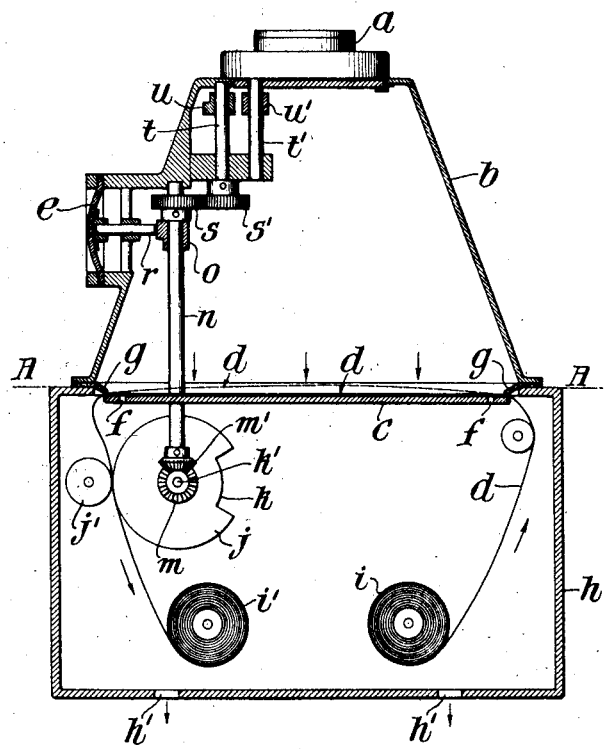
Fig. 1 is a sectional elevation of the camera.
Figure 2:
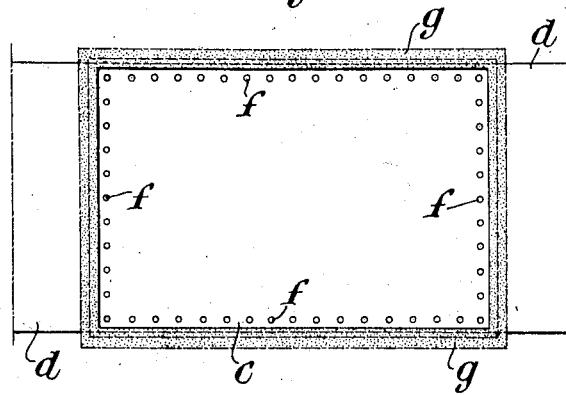
Fig. 2 is a sectional plan on line A—A of Fig. 1.

The camera body $b$, which carries the lens $a$, and the wall $c$ of which, opposite the lens, forms the surface against which the strip $d$ of film is pressed, is provided with a device for delivering compressed air, such as a diaphragm pump $e$ which is positively coupled, by means of suitable members, with the shutter mechanism on the one hand and the means for actuating the film on the other, in such a way that, at the moment of the exposure, that is, when the intermittently fed film is stationary, air in the interior of the body $b$ is compressed and acts against the film $d$ in the direction of the arrows, thereby pressing the film against the wall $c$, as indicated by the continuous lines in Fig. 1.

The intermittent feed movement of the film $d$ can be effected in various ways, for example by passing the film, on its way from the unwinding spool $i$ to the winding spool $i'$, between two rollers $j$ and $j'$, of which $j$ is provided with a peripheral gap $k$ and is of such dimensions that the portion of the periphery of said roller adjoining the gap corresponds to the length of the picture. Consequently, as the roller $j$ is rotated, the strip of film will be alternately fed forward a distance equal to the length of a picture (by the solid surface of the roller) and then remain stationary during the passage of the gap $k$.

In the example shown, the shaft $k'$ of the feed roller $j$ carries a keyed cone pinion $m$, which gears with a cone pinion $m'$ on the shaft $n$, which latter shaft is provided at the top with a cam $o$ co-acting with a plunger $r$ bearing on the diaphragm $e$. The shaft $n$ is also provided at its upper end with a pinion $s$ gearing with a pinion $s'$ on a shaft $t$. A cam $u$ on the shaft $t$ actuates a cam $u'$ on a shaft $t'$, the members $u$, $u'$ working the shutter mechanism in known manner. It is evident that, in this manner, the diaphragm $e$ is positively connected with the film feed on the one hand and the shutter mechanism on the other, so that the above described operation is performed automatically.

The plate $c$ is provided with marginal apertures $f$, disposed interiorly in relation to a packing marginal strip $g$ mounted in the body $b$ and directed towards the backing plate, said apertures also lying in the path traversed by the film $d$, so that, on compression of the air in the camera, the openings $f$ are closed by the film, whilst the packing strip $g$ which, as shown in Fig. 1, projects like a flange over the edge of the plate $c$, forms a tight joint between the body $b$ and the plate $c$. The air present under that portion of the film which is to be pressed flat temporarily is able to escape through the openings $f$ and the holes $h'$ in the film case $h$. When the feed movement of the film recommences, the openings $f$ are uncovered again, since the strip of film tends to resume the position indicated by broken lines in Fig. 1.

Having now particularly described and ascertained the nature of my said invention and in what manner the same is to be performed, I declare that what I claim is:—

1. In a roll-film camera, a camera body having a lens and a shutter mounted therein, a rear box portion on the camera body, actuating means for periodically advancing and stopping the films before the lens, coordinating means for operating the shutter and creating an air pressure in the camera body while the film is in a halted position, comprising a revoluble shaft in engagement with the film actuating means, a diaphragm having a piston attached thereto, a cam on the shaft making contact with the piston and connecting means between the cam and said shutter.

2. A roll-film camera comprising in combination, a lens, a shutter, a camera body having a chamber formed therein, supporting said lens and shutter, a rear box portion associated with said camera body, a wall intermediate said box portion and said camera body having a series of holes therethrough adapted to be closed periodically by the film when compression is created in the body chamber, actuating means for intermittently feeding the film in front of the intermediate wall, a main shaft connected to the actuating means, a cam on the end of said shaft, a diaphragm for periodically creating an air pressure in the body chamber when the diaphragm is operated, a piston connected to the diaphragm and actuated by the cam, a second cam shaft geared to the main shaft, and means connecting the second cam shaft with the shutter for operating same when air pressure is created in the body chamber, and a film is temporarily halted in front of the intermediate wall.

In testimony whereof I affix my signature.

OSKAR MESSTER.